UNITED STATES PATENT OFFICE.

THOMAS DRAYTON, OF BROOKLYN, NEW YORK, ASSIGNOR TO GEO. W. McREADY, JR.

IMPROVEMENT IN PURIFYING OILS.

Specification forming part of Letters Patent No. 11,239, dated July 4, 1854.

Specification of THOMAS DRAYTON, a native of England and resident in the United States of America, of the following invention—namely, the Method of Purifying Oils—so as to enable any person skilled in the art or science to make and use the same.

Take about one quart of alcohol to about a gallon of rosin-oil or other oil, such as sperm and all other fish and vegetable oils. Shake it well together from two to five minutes until the alcohol takes up the impurities contained in the rosin or other oils. Allow the mixture time to settle, which then resolves itself as follows—that is to say, into two distinct portions or strata, which is easily distinguished by the oil settling to the bottom, leaving the alcohol, with the impurities dissolved from the oils, on the top. The alcohol, after its admixture with the oil, absorbs its impurities, imparting to it the properties for burning, and it may then be drawn off when required for such purpose; and when not so required the alcohol, with the impurities thus absorbed, may be distilled for the purpose of obtaining the alcohol to use again, as above described.

The oil or remaining strata, if not sufficiently purified by the process aforesaid, which is easily known by the alcohol taking up no more impurities from the oil, may then be drawn off and placed upon plates for the purpose of depriving it of unpleasant odor that the oil may still retain. Heat may be applied to the plates containing the oil; or they may be exposed to the solar rays to facilitate the process of purification. I find that the oil, when spread upon the plates from about one-fourth of an inch to an inch in thickness, is more speedily purified. The oil thus purified can be used to advantage in all the ordinary mechanical purposes, as its resinous and coagulating properties are almost entirely removed. By repeating this process the most ordinary and indifferent oils can be refined to any desirable degree of purity.

This discovery, combining usefulness, excellence, and economy, is twofold in its results, for at the same time that the oil is purified an excellent burning-fluid is produced by the alcohol having taken up the soluble parts of the oil, possessing these advantages over the common burning-fluids now in use: first, it gives light of a superior steadiness and brilliancy; second, it is less expensive than the ordinary burning-fluid.

The above-described process is best adapted for rosin-oils.

The above-described process is used, as above set forth, either on a large or a small scale, in the practical operation.

What I claim as my invention is—

The above-described mode or process of using the above-described materials for the above-described purpose of purifying oil and producing a burning-fluid.

To all whom it may concern:

Therefore be it known that I, THOMAS DRAYTON, of the city of Brooklyn, in the county of Kings and State of New York, have invented a new method of making and compounding a burning-fluid, and also of purifying oil; and that I do hereby declare that the foregoing is a full and exact description of the same. What is set forth in the said foregoing description and specification, I, the said THOMAS DRAYTON, claim as my invention, and desire to have the same secured by Letters Patent—namely, the above-described mode or process.

In witness whereof I have hereunto subscribed my name and affixed my seal this 9th day of May, in the year of our Lord 1853.

THOMAS DRAYTON. [L. S.]

Witnesses:
   T. B. HOLES,
   R. L. LARREMORE.